United States Patent [19]

Park

[11] Patent Number: 4,784,871

[45] Date of Patent: Nov. 15, 1988

[54] METHOD FOR PRODUCING CALCIUM FORTIFIED YOGURT

[75] Inventor: Peter H. Park, Rochester, Minn.

[73] Assignee: Marigold Foods, Inc., Minneapolis, Minn.

[21] Appl. No.: 857,148

[22] Filed: Apr. 29, 1986

[51] Int. Cl.$^4$ .......................... A23C 9/13; A23C 9/133
[52] U.S. Cl. ........................................ 426/583; 426/74
[58] Field of Search ...................... 426/42, 43, 583, 74, 426/34, 61, 580

[56] References Cited

U.S. PATENT DOCUMENTS 4,410,549 10/1983 Baker ................................. 426/583

FOREIGN PATENT DOCUMENTS 1237357 9/1961 France ................................. 426/43

Primary Examiner—Marianne Cintins
Attorney, Agent, or Firm—Gregory P. Kaihoi; James R. Haller

[57] ABSTRACT

A method for producing a calcium fortified yogurt is disclosed wherein an acid soluble calcium salt is added to fruit flavoring which is subsequently combined with a yogurt base.

6 Claims, No Drawings

METHOD FOR PRODUCING CALCIUM FORTIFIED YOGURT

TECHNICAL FIELD

This invention relates to yogurt compositions and methods of manufacture, and more specifically to yogurt fortified with calcium.

BACKGROUND ART

Recent medical studies have indicated that a diet containing the U.S. recommended daily allowance (RDA) of calcium may be effective in preventing or mitigating osteoporosis, and also possibly high blood pressure and colon cancer. There is therefore great public interest in the consumption of food products which will supply the recommended daily allowance of calcium. Dairy products have traditionally been recognized as good sources of calcium. Yogurt in particular is frequently consumed by those persons who may be most in need of an adequate calcium intake, for example, people who are dieting, and pregnant or middle aged women. An eight ounce serving of fruit-flavored low fat yogurt provides only approximately 345 mg of calcium, however, in comparison to the U.S. RDA of 1,000 mg. It therefore is desirable to supplement the natural calcium content of yogurt.

Serious practical difficulties in incorporating calcium supplement into dairy products have been encountered, however, because most calcium salts have very low solubility in milk, which has a pH of about 6.8. In milk itself, up to 60-70% of the calcium exists as insoluble colloidal calcium phosphate associated with the casein micelles. Added calcium salts therefore tend to settle out, frustrating attempts to maintain uniform dispersions during manufacture. This problem is compounded by the fact that generally the yogurt base may not be agitated during the incubation period. Thus, in the manufacture of yogurt using vat incubation the required lack of agitation during incubation allows a substantial portion of the calcium salt to settle to the bottom of the vat. The salt then must be scraped off the bottom of the vat and blended into the yogurt, a process which not only is impractical using conventional yogurt manufacturing equipment, but also is likely to adversely affect the texture of the product.

DISCLOSURE OF INVENTION

The invention in one embodiment relates to a yogurt composition comprising from about sixty percent to about ninety five percent by weight of unflavored yogurt, from about five percent to about forty percent by weight of fruit flavoring, and visually undetectable calcium salt in a quantity sufficient to bring total calcium content of the composition to about 0.2% to about 1.3% by weight. Desirably the calcium salt is one of the group consisting of tricalcium phosphate, dicalcium phosphate, and hydrates thereof. In one preferred embodiment, namely, "Swiss" style yogurt, the calcium salt is distributed substantially uniformly throughout the composition. In another preferred embodiment, namely "sundae" style ("fruit on the bottom"), wherein the yogurt composition is contained within a serving container with the fruit flavoring substantially entirely on the bottom of said container, the calcium salt is non-uniformly distributed in the composition, being concentrated in or adjacent to the fruit flavoring.

In another embodiment, the invention relates to a process for manufacturing a fruit-flavored yogurt fortified by a calcium salt which is undetectable in the final product visually or by mouth feel including the steps of providing a fruit flavoring having a pH of less than about 4.6 and comprising from about 5-40% by weight of the total yogurt composition, providing an acid soluble calcium salt, and bringing the calcium salt into contact with the fruit flavoring and combining the fruit flavoring with the yogurt.

BEST MODE FOR CARRYING OUT THE INVENTION

Except as set forth below, the process of manufacturing the unflavored yogurt base used in the invention follows conventional yogurt manufacturing techniques which are well known and need not be described in detail. Briefly, however, the process typically begins with raw milk, which may contain a combination of whole milk, skim milk, condensed milk, dry milk, grade A whey, and/or cream blended to provide the desired fat and solids content. Stabilizers and thickeners such as starch, gelatin, pectin, agar and carrageenan may also be added if desired. This yogurt base is then pasteurized, typically by heating to 88° C. for 30 minutes, or alternately 95° C., for about 38 seconds. The pasteurized base is then cooled to incubation temperature, usually about 40°-45° C., and the culture, usually a combination of *lactobacillus bulgaricus* and *streptococcus thermophilus* bacteria, is added to begin the fermentation process. Fermentation is continued until the pH reaches approximately 4.4; depending upon temperature and amount of culture added, this may take from about three to about fourteen hours. It is important that the mixture not be agitated during the fermentation process to allow proper curd formation. When the proper pH has been reached, the yogurt is cooled.

In the manufacture of Swiss-style yogurt, a fruit flavoring is blended substantially uniformly throughout the yogurt after fermentation is complete but prior to packaging. In the manufacture of sundae style yogurt, fruit flavoring is deposited at the bottom of the consumer container, and the container is then filled with the yogurt mixture. Sundae-style yogurt may be incubated in either of two ways: (i) the unfermented yogurt base may be deposited in the consumer container which is then incubated in a hot room, or (ii) incubation may take place in a vat, as with Swiss-style yogurt, and added to the consumer container after fermentation is completed.

The fruit flavoring used in the invention may be any of a variety of conventional fruit flavorings commonly used in yogurt products. Typical flavorings include strawberry, raspberry, blueberry, strawberry-banana, boysenberry, cherry-vanilla, peach, pineapple, lemon, orange and apple. Generally, fruit flavorings include fruit preserves and fruit or fruit puree, with any of a combination of sweeteners, starch, stabilizer, natural and/or artificial flavors, colorings, preservatives, water and citric acid or other suitable acid to control the pH.

To facilitate solvation of the calcium salt, it is desirable that the pH of the fruit flavoring be less than about 4.6, and preferably in the range of about 3.3-4.0. The natural pH of different fruits varies somewhat, but pH control with citric acid or other suitable acids is easily accomplished.

The calcium salt may be added to the fruit flavoring during any convenient step of the manufacturing process of the flavoring. In one method of manufacturing the fruit flavoring, water and starch are added to the fruit preserves or fruit puree and the mixture is heated under constant agitation to approximately 190° F. to thicken. When fully cooked, the remaining cane sugar, flavor, color, preservatives, and other optional ingredients are thoroughly blended and the mixture then is cooled to approximately 170° F. for packaging. Calcium salts may be added to the mixture prior to the cooking step. Alternately, and preferably, however, the calcium salt is pre-blended uniformly with the cane sugar, and this blend is added to the fruit mixture after cooking is complete. In this fashion the calcium salt is less likely to cause lumping problems, assuring a more uniform distribution of the calcium salt. The calcium salt may increase the total viscosity of the fruit flavoring, and appropriate stabilizer and sweetener adjustments to the recipe may be desirable.

The calcium salt may be any suitable calcium compound which is acid soluble. It has been found that phosphate salts of calcium provide desirable weight ratios of calcium, in relation to the weight of the compound itself. In particular, two calcium salts are preferred. Tricalcium phosphate, also known as tribasic calcium phosphate or tricalcium orthophosphate is available in food chemicals codex grade from Stauffer Chemical Company, having the general formula $3Ca_3(PO_4)_2 \cdot Ca(OH)_2$. This product provides an assayed calcium content of from 34% to 40% by weight. Anhydrous dicalcium phosphate, also known as anhydrous dibasic calcium phosphate, having a formula of $CaHPO_4$, is also available from Stauffer in food chemical codex grade, providing an assay calcium content from about 30% to about 31.7% calcium by weight. Other calcium phosphate hydrates may also be useful, including, but not limited to, calcium pyrophosphate, calcium hexametaphosphate and monobasic calcium phosphate. --Other calcium salts that might be used include, but are not limited to, calcium ascorbate, calcium citrate, calcium carbonate, calcium gluconate, calcium lactate, and calcium sulphate. Phosphate salts are a preferred source of calcium, not only because of their acid solubility and weight ratios, but also because they are available commercially as a precipitate from whey, a natural dairy product.

Example No. 1:

Fruit flavoring was prepared by blending 34 parts strawberries, 5 parts water, and 3 parts starch under constant agitation while heating to 190° F. (88° C.). This mixture was held at that temperature for ten minutes to cook the starch, thus thickening the mixture. While the mixture was still hot but beginning to cool, 32 parts of a uniform 3:1 mixture of cane sugar and tricalcium phosphate was added, along with an additional 12 parts of cane sugar, 10 parts corn syrup, 4 parts natural flavoring, 0.015 parts U.S. certified food coloring, 0.10 parts potassium sorbate (preservative), and 0.5 parts of citric acid to bring the resulting pH to about 3.7. The resulting fruit flavoring mixture had a viscosity of 7 Boswick unit at 180° F. and was slightly lighter in color than similar fruit flavorings without calcium triphosphate. The calcium triphosphate, however, appeared to be uniformly dispersed and at least partially solvated, as it was not visually detectable apart from the slight lightening in coloring (i.e., individual granules were not visually detectable with the naked eye). The viscosity of the fruit was sufficient to prevent any settling of any unsolvated salt.

Yogurt base was prepared according to the following recipe:
84 parts skim milk
3 parts cream (to reach 1.2% butterfat content)
7 parts skim milk powder
1.1 parts starch
0.4 parts gelatin
0.07 parts carrageenan (stabilizer)
4.5 parts liquid sugar The above ingredients were blended according to well known commercial processes. The resulting yogurt base was then pasturized at 188° F. (88° C.) for 30 seconds, cooled to 106° F. (41° C.), and placed in an incubation vat where 1 part culture bacteria was added. The mixture was agitated for 30 minutes and then allowed to ferment for approximately 12-14 hours until the pH reached 4.4. At this point, gentle agitation was resumed along with cooling until the mixture reached 55° F. (13° C.), about one hour. Agitation was then discontinued to preserve viscosity of the unflavored yogurt.

The unflavored yogurt then was gently blended in a 4:1 ratio with the calcium fortified fruit flavoring, and the product was packaged using standard techniques. The resulting Swiss-style yogurt had a pH of 3.95, and a calcium content of 1,362 mg. per 8 ounce serving, the typical consumer package size. The texture, body, color, and flavor of the final product were comparable to similar yogurt products not containing calcium supplement: the tricalcium phosphate was not detectable visually or by mouth feel 24 hours after manufacture.

Example No. 2

Approximately 1.6 oz. of the fruit flavoring of Example No. 1 was placed in the bottom of an 8-oz. serving container, and 6.4 oz. of the unincubated, cultured yogurt base of Example No. 1 was added. The container was sealed and incubated at 106° F. (41° C.) for a period of 6 hours. When the yogurt reached a pH of about 4.4, the container was cooled to 40° F. (4° C.). Inspection of the product revealed no visibly detectable calcium triphosphate residue settled out of the fruit. Upon mixing the fruit and the yogurt with a spoon, the color, texture, body, and flavor of the product were good.

Example No. 3

Yogurt base according to Example No. 1 was prepared, adding 1.5 parts of tricalcium phosphate at the time other dry milk solids were added prior to pasteurization. The base was then vat incubated to pH 4.2, a period of about 6 hours. Inspection revealed that a substantial quantity of the calcium salt had settled to the bottom. It was necessary to scrape this calcium salt off the bottom of the vat, and substantial agitation was required to disperse the calcium throughout the yogurt. Total calcium content was about 1300 mg./8 oz. serving, after blending the settled calcium manually. The scraping and excess agitation necessary to uniformly distribute the tricalcium phosphate throughout the product (which was detrimental to the yogurt texture) was deemed to be impractical and unacceptable for actual manufacture processes.

Example No. 4

Example No. 3 was repeated, except that prior to incubation 1.6 oz. of a fruit flavoring, prepared according to Example No. 1 but without any tricalcium phosphate, was placed in the bottom of an 8 oz. serving container. The yogurt base was then added to the container, and incubated for 6 hours to pH 4.2. Total calcium content was 1000 mg per 8 oz. serving. Inspection of the finished product 24 hours after packaging showed good body and texture, and no tricalcium phosphate was visually detectable at the yogurt-fruit interface. Final pH of the product after mixing the fruit throughout the yogurt was about 3.95.

Examples No. 5–6

Example No. 1 was repeated with dicalcium phosphate (anhydrous and dihydrate), and again with a combination of tricalcium phosphate and dicalcium phosphate (anhydrous and dihydrate). Results were comparable, yielding total calcium content in the range of 1000–1300 mg per 8 oz. serving.

Although a preferred embodiment of the present invention has been described, it should be understood that various changes, adaptations and modifications may be made therein without departing from the spirit of the invention and the scope of the appended claims.

I claim:

1. A method of producing a fruit-flavored yogurt fortified with a calcium salt which is undetectable in the final product visually or by mouth feel comprising the steps of:
   a. providing a fruit flavoring having a pH of less than about 4.6 and comprising from about five percent to about forty percent by weight of the finished yogurt product;
   b. adding an acid soluble calcium salt into the fruit flavoring, in an amount effective to provide the desired calcium enrichment, and allowing the fruit flavoring to at least partially solvate the calcium salt; and
   c. combining the calcium enriched fruit flavoring with the yogurt.

2. The method of claim 1 wherein the calcium source if selected from the group consisting of tricalcium phosphate, dicalcium phosphate, and hydrates thereof.

3. The method of claim 1 wherein the fruit flavoring includes sugar, and including the step of pre-blending the calcium salt into a sufficient quantity of the sugar to provide a substantially uniform dispersion thereof.

4. A method of producing a finished fruit-flavored yogurt product fortified with a calcium salt which is visually undetectable in the finished yogurt product comprising the steps of:
   a. blending an acid soluble calcium salt into a sufficient quantity of sugar to provide a substantially uniform dispersion thereof, the calcium salt being selected from the group consisting of tricalcium phosphate, dicalcium phosphate, and hydrates thereof;
   b. combining the sugar-calcium salt mixture with a fruit flavoring base to provide a fruit flavoring having a pH of less than about 4.6; and
   c. blending a quantity of the fruit flavoring with unflavored yogurt so that the fruit flavoring comprises from about 5% to about 40% by weight of the finished yogurt product.

5. The method of claim 4 wherein the fruit flavoring has a pH of less than about 4.0.

6. A method of producing a finished fruit-flavored yogurt product fortified with a calcium salt which is visually undetectable in the finished yogurt product comprising the steps of:
   a. blending an acid soluble calcium salt into a sufficient quantity of sugar to provide a substantially uniform dispersion thereof, the calcium salt being selected from the group consisting of tricalcium phosphate, dicalcium phosphate, and hydrates thereof;
   b. combining the sugar-calcium salt mixture with a fruit flavoring base to provide a fruit flavoring having a pH of less than about 4.6; and
   c. placing a quantity of the fruit flavoring on the bottom of a container and adding an unflavored, unincubated yogurt base so that the fruit flavoring comprises about 5% to about 40% by weight of the finished yogurt product, and incubating the container to produce the finished yogurt product.

* * * * *

UNITED STATES PATENT AND TRADEMARK OFFICE
CERTIFICATE OF CORRECTION

PATENT NO. : 4,784,871
DATED : November 15, 1988
INVENTOR(S) : Peter H. Park

It is certified that error appears in the above—identified patent and that said Letters Patent is hereby corrected as shown below:

1. Column 1, line 3, delete "FORTIFIED YOGURTTECHNICAL FIELD" and insert --FORTIFIED YOGURT-- . (Next line) --TECHNICAL FIELD-- .

2. Column 1, line 52, delete "undetect able" and insert --undetectable-- .

3. Column 5, lines 37 and 38, delete "source if" and insert --source is--.

Signed and Sealed this

First Day of August, 1989

Attest:

DONALD J. QUIGG

Attesting Officer

Commissioner of Patents and Trademarks